(12) United States Patent
Conus et al.

(10) Patent No.: US 8,315,392 B2
(45) Date of Patent: Nov. 20, 2012

(54) METHOD TO SECURE ACCESS TO AUDIO/VIDEO CONTENT IN A DECODING UNIT

(75) Inventors: Joel Conus, Essertines-sur-Yverdon (CH); Philippe Stransky, Cheseaux (CH)

(73) Assignee: Nagravision, S.A., Cheseaux-sur-Lausanne (CH)

( * ) Notice: Subject to any disclaimer, the term of this patent is extended or adjusted under 35 U.S.C. 154(b) by 280 days.

(21) Appl. No.: 12/756,655

(22) Filed: Apr. 8, 2010

(65) Prior Publication Data

US 2010/0272267 A1   Oct. 28, 2010

(30) Foreign Application Priority Data

Apr. 27, 2009   (EP) .................................... 09158878

(51) Int. Cl.
*H04L 9/00* (2006.01)
(52) U.S. Cl. ............. 380/277; 380/44; 713/171; 726/30
(58) Field of Classification Search .................. 713/171, 713/189, 193; 380/44, 277, 286, 281; 726/30; 725/31
See application file for complete search history.

(56) References Cited

U.S. PATENT DOCUMENTS

| 6,535,607 | B1 * | 3/2003 | Chandersekaran et al. | .. 380/286 |
| 2004/0114764 | A1 | 6/2004 | Dauvois et al. | |
| 2009/0067622 | A1 | 3/2009 | Yao et al. | |

FOREIGN PATENT DOCUMENTS

| JP | 2008-034938 | 2/2008 |
| WO | WO 2009/007876 | 1/2009 |

OTHER PUBLICATIONS

European Search Report issued in EP 09 158 878, mailed Oct. 8, 2009.
English language abstract of JP 2008-034938, published Feb. 14, 2008.
Wenjun Zang et al., "Multimedia Security Technologies for Digital Rights Management", 2006, Academic Press, pp. 306-307, XP002549200.

* cited by examiner

*Primary Examiner* — Kim Vu
*Assistant Examiner* — Baotran N To
(74) *Attorney, Agent, or Firm* — DLA Piper LLP US

(57) ABSTRACT

The present invention concerns the generation of a key necessary to decrypt audio/video contents by genuine decoding units. It concerns in particular a method to secure the reception of a broadcast content managed by a control center and encrypted by at least one content key, said content key or a data allowing to recover said content key being transmitted to the decoding units encrypted by a transmission key common to the decoding units, each decoding unit having at least one environment parameter known by the control center, said decoding unit receiving from the control center a first message common to all decoding units and comprising the encrypted transmission key and a second message, pertaining to said decoding unit and comprising correction data dedicated to said decoding unit, the decryption of the transmission key being made using the environment parameter and the correction data.

15 Claims, 1 Drawing Sheet

METHOD TO SECURE ACCESS TO AUDIO/VIDEO CONTENT IN A DECODING UNIT

The present invention relates to the domain of pay-TV, in particular to the treatment of an audio/video signal, at the transmission and at the reception of said signal, to only allow a subscriber with the appropriate authorisation to access the original content when using genuine decoding units.

BACKGROUND OF THE INVENTION

In common Pay-TV decoding units (also known as Set-top-box), the decoding unit comprises a slot to insert a security module (generally in the form of a smart card). The handling of the rights, the decryption of the keys to access the content is carried out in such security module.

Those security modules can be implemented in a variety of manners such as on a microprocessor card, on a smartcard or any electronic module in the form of a badge or key. These modules are generally portable and detachable from the decoding unit.

The most commonly used form has electrical contacts but contactless versions of type ISO 14443 also exist. Another implementation of the security module exists where it is directly soldered inside the decoding unit, a variation of this being a circuit on a socket or connector such as a SIM module. Yet another implementation is to have the security module integrated on a chip which has another function e.g. on the de-scrambling module or on the microprocessor module of the decoding unit. The security module can also be implemented in software.

The decoding unit could have peripherals such as remote control, external hard disk, conditional access module (such as provided by SmarDTV™) or security elements connected via USB, PCMCIA, ISO7816 or Bluetooth. Those peripherals interact with the decoding unit and contain identification data.

Some decoding units do not contain a security module and the security operations are carried out directly by the software—protected or not by so called SW protection techniques such as code obfuscation and/or White-Box Cryptography—of the decoding unit. In such a case, the decoding unit regularly initiates a connection with a management center to receive the keys to descramble the audio/video content. This connection can be made via a modem or via IP (Internet) connection.

In the case that no such connection is available, the security relies only on software verification of the rights carried out by the decoding unit.

The temptation is great to acquire a general purpose decoding unit and load into it a modified version of the software that skips the verification of the rights.

The aim of the present application is to offer a better way to secure the audio/video content received by a decoding unit.

BRIEF DESCRIPTION OF THE INVENTION

The present invention concerns the generation of a key necessary to decrypt audio/video contents by genuine decoding units.

It concerns in particular a method to secure the reception of a broadcast content managed by a control center and encrypted by at least one transmission key or a datum allowing to recover said transmission key and transmitted to at least one decoding unit, said decoding unit having at least one environment parameter known by the control center, and executing the following steps:

receiving from the control center a first message common to a plurality of decoding units comprising the encrypted transmission key, receiving from the control center a second message pertaining to said decoding unit comprising correction data, decrypting the encrypted transmission key using at least one environment parameter of said decoding unit and the correction data.

The environment parameter is a datum extracted from the decoding unit or from one of its peripheral and linked with some logical or physical configuration. Examples of an environment parameter are as follows:

a software version of said decoding unit or one of its peripherals, such as V3.2c configuration data of an hardware module, such as the version or designation of a chipset, the identification of some hardware modules (decryption module DES, IDEA) present in the decoding unit or one of its peripherals, status information of hardware module, such as the information loaded into the registers of these hardware modules while the decoding unit or one of its peripherals is running its operating system, a certificate, such certificate being loaded into the main software or into the various peripherals. Some of the communication peripherals contain such certificate that is used during the creation of a secure channel, a hash function of all or part of the software, this can be used to calculate a signature on the software and use this signature as a key; only a part of the software e.g. the loader in charge of the security operation can be considered for the generation of the signature (Notice that the result of this hash might be unique per decoding unit or one of its peripherals. This is typically the case when software protection techniques are used; in this case unique software, embedding unique secrets, can be provided individually to each decoding units), a location indication of the decoding unit, this could be done by the data extracted from a GPS, or the data extracted from a GSM network, or the location indication stored in the memory of the decoding unit such as the ZIP code, a hardware address of a local network interface, such as a hardware address (MAC address) of the communication interface, an identification number of the chipset, Hard disk or video card of said decoding unit, these devices having each a personal serial number, identification data of one of the peripherals of the decoding unit, this peripheral could be a remote control, a removable hard disk, a mobile phone (or smartphone) connected with the decoding unit via infra-red or radio frequency (Bluetooth), a television screen.

This invention involves three elements, namely:

the first one being the encrypted transmission key, generated and transmitted by the control center toward a plurality of decoding units, the second one is the environment parameter, extracted by the decoding unit and known by the control center, this parameter being unique for a decoding unit of for a group of decoding unit (by group it is meant a number of decoding units less than the decoding units receiving the first element), correction data, generated and transmitted by the control center toward a decoding unit or a group of decoding units.

The main idea is to need the cooperation of the environment parameter and the correction data in the decoding unit to extract the transmission key from the encrypted transmission key.

BRIEF DESCRIPTION OF THE DRAWINGS

The invention will best be understood by reference to the following detailed description of the preferred embodiment when read in conjunction with the accompanying drawings, wherein.

DETAILED DESCRIPTION OF THE PREFERRED EMBODIMENT

Figure 1:
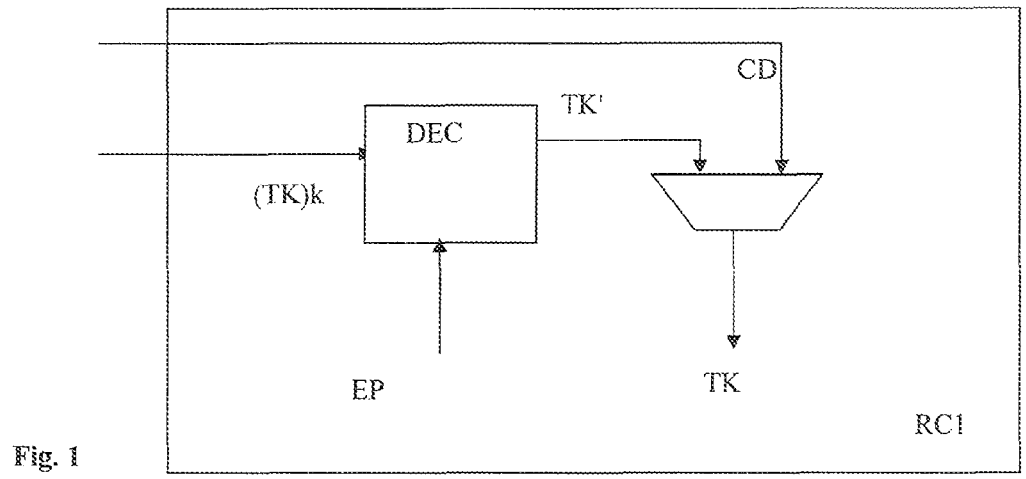
FIG. 1 shows a block diagram of the elements participating to the obtaining of the transmission key in a decoding unit.

The present invention is of particular relevance to the pay-TV industry and makes use of the elements implemented in a genuine decoding unit to access the keys necessary to decrypt an audio/video content. A decoding unit can be a specific electronic box such as a set-top-box or a personal computer having capabilities to decode the encrypted content. It comprises a processor executing a program stored in a memory of said decoding unit. It will be below referred as decoding unit.

According to the method of the invention, the control center sends two types of messages, the first one being common to a plurality of decoding units and the second one being targeted to only one decoding unit or a group of decoding units. In case that the second message targets a group of decoding units, those units share at least some environmental parameters.

Several embodiments can be used to obtain the transmission key TK in clear, namely:
- decrypt the encrypted transmission key (TK)k using the environment parameter to obtain the intermediate transmission key TK', and further decrypt the intermediate transmission key TK by the correction data to obtain the transmission key TK,
- decrypt the encrypted transmission key (TK)k using the correction data to obtain the intermediate transmission key TK", and further decrypt the intermediate transmission key TK" by the environment parameter to obtain the transmission key TK, (note: the intermediate transmission key TK" is different than the intermediate transmission key TK', both are temporary information to finally obtain the transmission key)
- calculating the encryption key k by a function of the correction data and the environment parameter, and decrypting the encrypted transmission key (TK)k using the encryption key k.

The term "decryption" can also be an "encryption" or a mathematical function such as XOR.

The detailed description is now focused on the first embodiment. The other implementations are equally valid.

Once the environment parameter is fetched by the decoding unit, it is used to decrypt the encrypted transmission key contained in the first message. Since the environment data pertains to a particular decoding unit, the result of the decryption is different for each decoding unit.

The aim is to obtain a transmission key that is the same for all genuine decoding units and this is why the second message contains the correction data to be applied on the result of the decryption.

In the control center, a first datum is randomly generated and will serve as the encrypted transmission key (TK)k. This datum can be embedded in the first message for broadcast to all decoding units. Another datum is also generated by the control center and can by either the encryption key k or the transmission key TK. If this datum is the encryption key k, the encrypted transmission key (TK)k is decrypted to obtain the transmission key TK.

The second step is to calculate the correction data CD for each decoding unit (RC1). For a given decoding unit RC, the environment parameter EP is used in the encryption process. The control center executes a cryptographic function (encryption or decryption) using the environment parameter and the encrypted transmission key. Since the same cryptographic function will be used in the decoding unit, the key of this function can be either the encrypted transmission key or the environment parameter.

The resulting datum from this function is called the intermediate transmission key TK' and is still not useful at that stage since this result is different for each decoding unit.

According to an embodiment of the invention, the second message (uniquely or group addressed) is sent well in advance before a transmission key TK change occurs in order to be able to reach all decoding units. The first message is sent just before the transmission key change so that the decoding unit is able to get the transmission key shortly before using it. This reduces the risk that a hacker has the time to crack the messages and provide the transmission key to non-authorized decoding units.

The final transmission key TK is generated randomly directly by the control center or by a common control center in a Simulcrypt environment.

The correction data CD is calculated by combining the intermediate transmission key TK' and the transmission key TK. This combination is preferably an XOR function or a reversible cryptographic function, the intermediate transmission key TK' serving as the key. On open platform, White-Box Cryptography and software obfuscation techniques can be used for preventing reverse-engineering of the combination function and the potential keys in action. An even safer implementation would secure in the same White-Box Crypto block the first decoding stage and this corrective action.

This result of the combination can be embedded in the second message, this message being individual (or dedicated to a group). The header of the second message contains the identification of the decoding unit or the group of decoding units.

According to an embodiment of the invention, the first or the second message contains additionally the indication of the environment parameter used for the generation of the transmission key. Since it is possible to select or mix two or more environment parameters, the message will describe which parameters are used.

This could be done with a simple bitmap, each bit being dedicated to one parameter, the value resulting from one parameter being mathematically combined with the other designated parameters.

On the reception side, as illustrated in the FIG. 1, the decoding unit receives the first message and extracts the encrypted transmission key (TK)k. For the example below, we assume that the environment parameter is a hash value of a software portion. The decoding unit calculates the hash value (H) of the selected software and uses this value in a cryptographic function with the encrypted transmission key (TK)k. As explained above with respect to the control center, the cryptographic function will be executed with two parameters namely the encrypted transmission key (TK)k and the hash value (H). One can be used as the input data and the other one as the key and vice-versa.

The cryptographic function can be an obfuscating function, i.e. the order to the bits (or block of bits) in the message is shuffled or masked or distributed in non-contiguous memory, or in one of many different obfuscating functions. The environment parameter is a key to put the bits of the message in the proper order.

The result of this cryptographic function gives the intermediate transmission key TK' and needs further processing. This is done thanks to the data contained in the second message dedicated to said decoding unit.

It is to be noted that the control center broadcasts a lot of second messages, one per decoding unit or group of decoding units. Each second message has an address field that indicates the decoding unit identification such as a serial number. The decoding unit filters the second messages until the identification matches its identification.

This second message is only dedicated to said decoding unit and contains correction data CD for said decoding unit.

In order to obtain the final transmission key TK, the decoding unit executes an XOR function with the intermediate transmission key TK and the correction data CD. According to another embodiment, the transmission key TK' can be obtained by the inverse function of that made in the control center, this function using the intermediate transmission key TK' as a key and the correction data CD as input data.

Once the transmission key is obtained, this key can be used to directly decrypt the audio/video content. This key could be the control word that allows access to a portion of the audio/video content or a content key to decrypt a service during 24 hours.

The transmission key can be used to decrypt messages comprising the key to decrypt the content. These keys are the control words that change rapidly. The transmission key is valid for a long time in comparison with the control word, e.g. 1 week.

According to a particular embodiment, the cryptographic function that gives the intermediate transmission key TK' can be personalized with data pertaining to said decoding unit. In case that this is an encryption process, this process could be a non-standard process that uses specific data. Since the control center has the image of the encryption process of said decoding unit, the control center will take into account the personalized data while calculating the intermediate transmission key TK' and thereafter, the correction data CD will also take into account this particular data.

An example of such parameters is the SBox loaded in an IdeaNxt encryption engine.

The encryption engine can be downloaded in the decoding unit via a connection through an IP network. Once the decoding unit is switched on, its connects to a service center to download the encryption or the parameters of said encryption valid for a limited time (a day, a week etc.). During the connection, the service center requests the identification data of the subscriber so as to detect fake decoding units. The verification of the identification can additionally be done with a challenge that is generated by the service center, this challenge being sent to the decoding unit. In return the decoding unit performs some operation with the challenge, these operations using the characteristics of the decoding unit and send it to the service center. This center can then verify the decoding unit by checking if the identification data are conform with the response to the challenge.

As already explained, the second message is individually addressed and therefore increases the bandwidth used for the service information. At the same time, when the transmission key changes, it is necessary to update the correction data pertaining to the new transmission key thus leading to the transmission of a second message for each decoding unit.

In order to reduce the bandwidth used for the second messages, the latter will embed more than one correction data that will be applied to several first messages' content. The first message will preferably contain an index indicating which correction data has to be used with the encrypted transmission key (TK)k in this message.

The transmission key TK can change at a rate defined by the control center. In this case, it would be advisable to include into the first and second messages the data relative to the current and the next transmission key. In this case, a synchronization process is necessary so that the proper transmission key is used. This can achieved by adding an identification data in the messages decrypted by the transmission key to identify the key that has served to encrypt the message. The decoding unit receives in advance the next transmission key and store it. When the ECM message is received indicating the new transmission key identifier, this key is used in place of the previous one.

Figure 2:
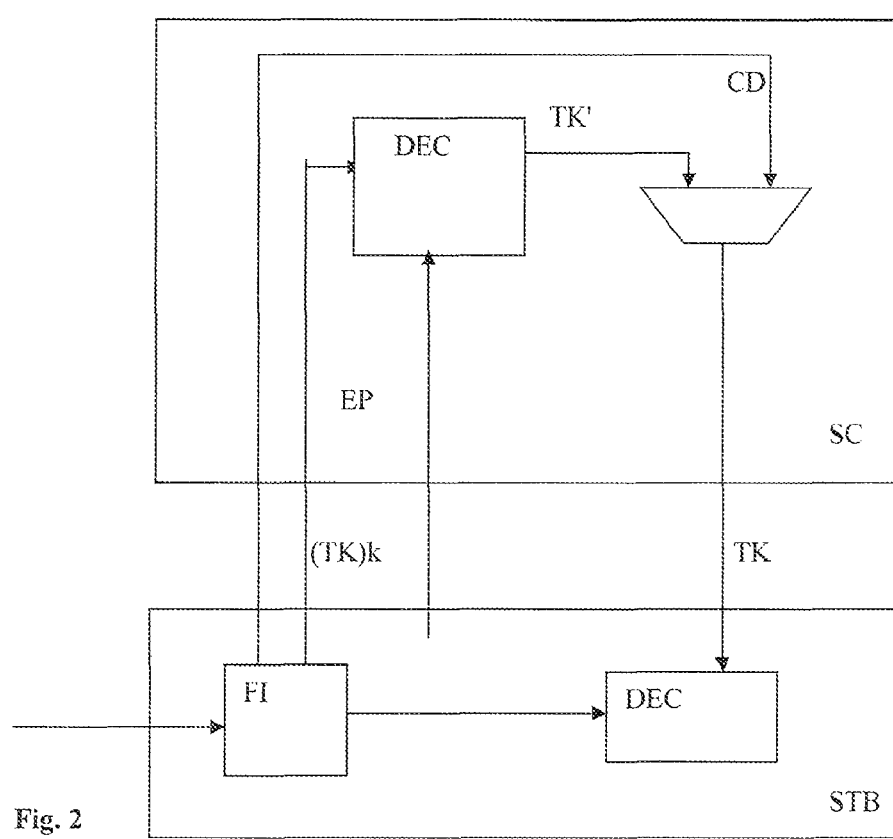
FIG. 2 shows a block diagram of the elements participating to the obtaining of the transmission key with a security module and a decoding unit.

In the embodiment illustrated at the FIG. 2, the obtaining of the final transmission key TK is carried out using two distinct devices, namely the receiver/decoder (STB) and the security module (SC). These two devices form the decoding unit (RC1). The environment parameters (EP) are preferably extracted from the receiver/decoder (STB) and passed to the security module (SC). The receiver/decoder (STB) receives the incoming data stream and comprises a filter (FI) to extract the management data pertaining to the security module (SC). These management data are the management messages (EMM) containing the encrypted transmission key (TK)k and the correction data CD. Since the management messages are usually not accessible by the receiver/decoder (the key to decrypt such messages being only in the security module), the security module can interrogate the receiver/decoder to obtain the environment parameter. In case that the environment parameter represents a signature on a large number of data such as the hash of the software code, the hash function can be carried out by the receiver/decoder and the result passed to the security module.

The environment parameter can be then collected not only in the receiver/decoder but also in the security module.

Once the transmission key TK is calculated by the security module, it is passed back to the receiver/decoder to be applied onto the decoder DEC. It is to be noted that the channel to transmit the transmission key TK is secured i.e. all data passed back to the receiver/decoder are encrypted by a key pertaining to the couple receiver/decoder and security module.

It is to be noted that the first or the second message transmitted to the decoding unit can comprise access right conditions. These conditions are verified in the security module if the corresponding rights are present. The second message being addressed to a unique decoding unit can also contain the update of the subscriber's rights or the update of the security keys, i.e. the keys decrypt management messages. The second message is preferably encrypted by a key unique for the targeted decoding unit.

The invention claimed is:

1. A method to secure the reception of a broadcast content managed by a control center and encrypted by at least one transmission key or a datum allowing to recover said transmission key and transmitted to at least one decoding unit, said decoding unit having at least one environment parameter known by the control center, said method comprising the following steps, executed by a processor of the decoding unit:
   receiving from the control center a first message common to a plurality of decoding, units comprising the encrypted transmission key;
   receiving from the control center a second message pertaining to said decoding unit the second message comprising correction data, said correction data being based on the at least one environment parameter of the decoding unit;
   determining by the decoding unit at least one environment parameter of the decoding unit, said environment parameter being selected from among the group of parameters consisting of:
   a software version of said decoding unit;
   configuration data of a hardware module of said decoding unit;
   status information of a hardware module of said decoding unit;
   a certificate stored in said decoding unit;
   a hash function of all or part of the software of said decoding unit;
   a location indication of the decoding unit;
   a hardware address of a local network interface of said decoding unit:
   an identification number of one of the hardware devices of said decoding unit;
   identification data of a peripheral of said decoding unit; and
   any combination of any of the foregoing; and
   decrypting the encrypted transmission key using the environment parameter and the correction data.

2. The method according to claim 1, wherein decrypting the encrypted transmission key comprises:
   applying a decryption process on the encrypted transmission key using, at least one of said environment parameters as a key to obtain an intermediate transmission key; and
   combining the intermediate transmission key with the correction data to obtain the transmission key.

3. The method according to claim 1, wherein decrypting the encrypted transmission key comprises:
   applying a decryption process on the encrypted transmission key using the correction data as a key to obtain a second intermediate transmission key; and
   combining the second intermediate transmission key with the at least one of said environment parameters to obtain the transmission key.

4. The method according to claim 1, wherein decrypting the encrypted transmission key comprises:
   combining the at least one of said environment parameters with the correction data to obtain an encryption key; and
   applying a decryption process on the encrypted transmission key using the encryption key to obtain the transmission key.

5. The method according to claim 1, wherein the second message is addressed to a group of decoding units and comprises correction data relating to the environmental parameter of said group of decoding units.

6. The method according to claim 1, wherein the first message or the second message comprises a descriptor of the environmental parameter to be used by the decoding unit, said descriptor serving as selecting the environmental parameter used by the decoding. unit.

7. The method according to claim 1, wherein the transmission key is directly used to decrypt said content 8. The method according to claim 1, wherein the transmission key is used to decrypt control messages containing the keys to decrypt the content.

9. The method according to claim 1, wherein the decoding unit comprises a memory to store all or part of the software related to the decryption process, this memory being updated by the reception of update messages from the control center.

10. The method according to claim 1, wherein the second message comprises a plurality of correction data, each correction data being used with a different encrypted transmission key sent at different time.

11. The method according to claim 1, wherein the second message is common to a group of decoding units and wherein the environment parameter is shared by the group of decoding units.

12. A system for controlling access to broadcast content, the system comprising:
   a control center configured to broadcast the content encrypted by at least one transmission key or a datum allowing for recovery of said transmission key;
   a first decoder unit configured to receive the content broadcast by the control center, the first decoder having a first environment parameter known to the control center;
   a second decoder unit configured to receive the content broadcast by the control center, the second decoder unit having a second environment parameter different from the first environment parameter and known to the control center;
   wherein the control center is further configured to perform the steps of
      transmitting a common message to the first decoding unit and the second decoding unit, the common message comprising the encrypted common transmission key;
      calculating first correction data for the first decoder unit, the first correction data being based on the first environment parameter of the first decoder unit;
      transmitting the first correction data to the first decoder unit;
      calculating second correction data for the second decoder unit, the second correction data being based on the second environment parameter of the second decoder unit;
      transmitting the second correction data to the second decoder unit; and
   wherein the first decoder unit is further configured to perform the steps of
      receiving the common message including the encrypted common transmission key;
      receiving the first correction data;
      determining the first environment parameter;
      decrypting the common transmission key in the common message using the first correction data and the first environment parameter; and
      decrypting the content using the common transmission key;
   wherein the second decoder unit is further configured to perform the steps of
      receiving the common message including the encrypted common transmission key;
      receiving the second correction data;
      determining the second environment parameter;

decrypting the common transmission key in the common message using the second correction data and the second environment parameter; and decrypting the content using the common transmission key; and wherein the respective environment parameters of the first and second decoding units is a parameter selected from the group consisting of a software version of the respective decoding unit; configuration data of a hardware module of the respective decoding unit; status information of a hardware module of the respective decoding unit; a certificate stored in the respective decoding unit; a hash function of all or part of the software of the respective decoding unit; a location indication of the respective decoding unit; a hardware address of a local network interface of the respective decoding unit; an identification number of one of the hardware devices of the respective decoding unit; an identification data of a peripheral Of the respective decoding unit; and any combination of any of the foregoing.

13. The system of claim 12, wherein the step of decrypting the common transmission key comprises:

applying a decryption process on the encrypted transmission key using at least one of said environment parameters as a key to obtain an intermediate transmission key; and combining the intermediate transmission key with the correction data to obtain the transmission key.

14. The system of claim 12, wherein the step of decrypting the common transmission key comprises:

applying a decryption process on the encrypted transmission key using the correction data as a key to obtain a second intermediate transmission key; and combining the second intermediate transmission key with the at least one of said environment parameters to obtain the transmission key.

15. The system of claim 12, wherein the step of decrypting the common transmission key comprises:

combining the at least one of said environment parameters with the correction data to obtain an encryption key; and applying a decryption process on the encrypted transmission key using the encryption key to obtain the transmission key.

* * * * *